Sept. 29, 1959   C. L. ALDRIDGE ET AL   2,906,794
PREPARATION OF OLEFINS
Filed April 10, 1956
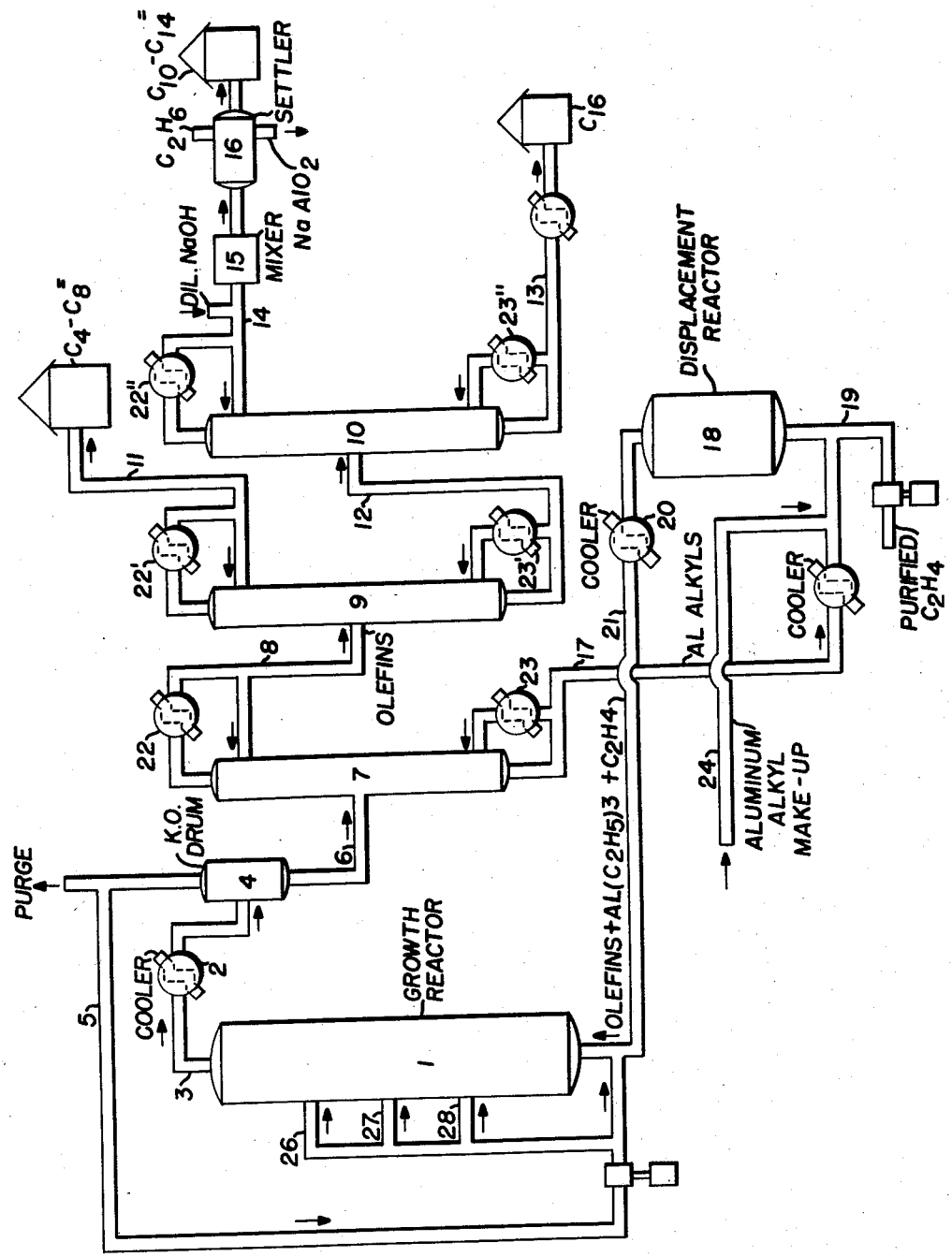
William E. Catterall
Donald W. Wood      Inventors
Clyde L. Aldridge
By  Henry Berk  Attorney

United States Patent Office 2,906,794
Patented Sept. 29, 1959

2,906,794

PREPARATION OF OLEFINS

Clyde Lee Aldridge, Baker, La., and William E. Catterall, Summit, and Donald W. Wood, Highland Park, N.J., assignors to Esso Research and Engineering Company, a corporation of Delaware Application April 10, 1956, Serial No. 577,334

7 Claims. (Cl. 260—683.15)

The present invention relates to the preparation of $C_4$-$C_{16}$ and higher molecular weight olefins. More particularly, this invention relates to a novel continuous process for the production of straight-chain alpha olefins by first growing a low molecular weight alkene onto a low molecular weight straight chain aluminum trialkyl in the present of a diluent in a first zone, separating the diluent from the resulting higher molecular weight aluminum trialkyls, displacing the higher molecular weight alkyl radicals of the aluminum trialkyl with certain low molecular weight alkenes in a second zone to generate olefins and employing the thus generated olefins as the diluent for the first zone.

Under certain reaction conditions lower alkenes, such as ethene, may be grown on to a low molecular weight aluminum trialkyl whereby the alkyl radicals have an increased number of carbon atoms. For example, when ethene is reacted with or grown on to aluminum triethyl under certain temperatures and pressures, the resulting product will be a mixture of aluminum trialkyls wherein the alkyl groups contain 4 to 16 and more carbon atoms. A typical product from such a reaction at 200° F. and 1500 p.s.i. ethene partial pressure contains the following aluminum compounds:

|  | Weight percent |
|---|---|
| $Al(C_4H_9)_3$ | 20.3 |
| $Al(C_6H_{13})_3$ | 27.8 |
| $Al(C_8H_{17})_3$ | 24.8 |
| $Al(C_{10}H_{21})_3$ | 13.7 |
| $Al(C_{12}H_{25})_3$ | 6.0 |
| $Al(C_{14}H_{29})_3$ | 4.7 |
| Al(higher alkyls)$_3$ | 2.7 |

The product distribution, however, can be varied considerably by modifying reaction time, temperature, pressure and proportions of feed, e.g., aluminum alkyl to ethene ratio.

In any event when ethene is employed as the growth reagent the carbon atom length of the alkyl chains is increased in multiples of two. Other low molecular weight alkenes, such as propene and butene, may also be used as growth reagents and these reactants will generally effect an increase in the alkyl chain in multiples of three and four respectively. However, alkenes above ethene are not particularly preferred as growth reagents since they are less reactive and tend to form branched chain radicals rather than the desired straight chain alkyl groups. These branched radicals break off easily to form olefins according to the following illustrative equations:

(1) $Al(C_2H_5)_3 + 3C_4H_8 \longrightarrow$

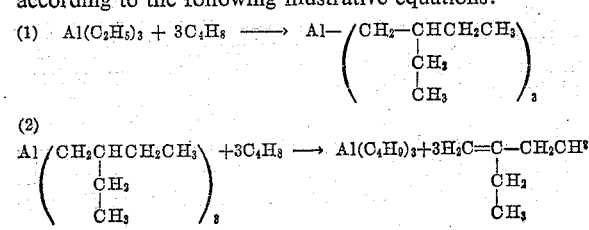

Eventually, the aluminum triethyl is all converted to aluminum tri-n-butyl. The reactions then most likely proceed as follows:

(3)
$Al(C_4H_9)_3 + 3C_4H_8 \longrightarrow$

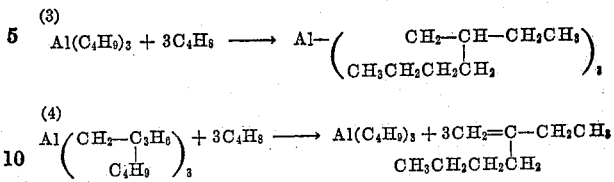

(4)

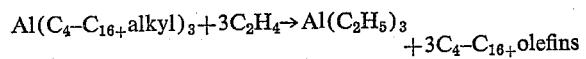

With alkenes higher than ethene the reaction might more correctly be called olefin dimerization rather than alkyl growth.

The resulting mixture of aluminum trialkyls formed in the so-called growth stage may then be reacted with a low molecular weight alkene to effect a displacement of the higher molecular weight alkyl radicals in the aluminum trialkyls as typified by the following type reaction:

$$Al(C_4\text{-}C_{16+}\text{alkyl})_3 + 3C_2H_4 \rightarrow Al(C_2H_5)_3 + 3C_4\text{-}C_{16+}\text{olefins}$$

It would seem that the resulting product mixture containing the $C_4$-$C_{16+}$ olefins and aluminum triethyl could then be fractionated to recover olefins and aluminum triethyl suitable for reuse in the growth stage. However, aluminum triethyl has a boiling point very close to the $C_{12}$ straight chain olefin. Consequently, fractionation of the product mixture will result in obtaining a relatively pure low molecular weight cut, e.g., $C_4$-$C_8$ olefines, a relatively pure high molecular weight cut, e.g., $C_{16+}$ olefins, and an intermediate cut containing $C_{10}$-$C_{14}$ olefins contaminated with aluminum triethyl. To effect a separation of the valuable $C_{10}$-$C_{14}$ straight chain alpha olefins, this intermediate cut can be passed to a second growth reactor wherein under carefully controlled conditions the aluminum triethyl may be reacted with ethene in a manner similar to that in the first growth stage to produce higher boiling aluminum trialkyl, e.g., aluminum tributyl. The thus reacted intermediate cut is then fractionated in a known manner to produce overhead the relatively pure $C_{10}$-$C_{14}$ olefins and as a bottoms product aluminum tributyl for reuse.

It is well known that lower molecular weight aluminum trialkyls, and especially aluminum triethyl, are extremely dangerous to handle since they are prone to spontaneous combustion when in contact with air. Also, direct contact with water which may occur as a result of some cooling procedures must be avoided due to the explosive reaction of aluminum trialkyls with water.

Besides the safety factors involved, it is readily seen that a process requiring two growth stages leaves much to be desired. From a practical standpoint the inclusion of a second growth stage adds considerably to the cost of producing olefins due to the additional equipment and control necessary for this stage.

It is therefore a primary object of the invention to provide a continuous process for the preparation of certain olefins by the growth of ethene on to low molecular weight aluminum trialkyls and the subsequent displacement with an alkene without resort to a second growth stage.

In general, to carry out the present invention a low molecular weight aluminum trialkyl is reacted in a first zone with ethene in the presence of an inert diluent which may be recycle or fresh olefin to form higher molecular weight aluminum trialkyls corresponding to the desired olefins. The thus reacted mixture will contain higher molecular weight aluminum trialkyls, olefins, which are present in this stage as an inert diluent, and some unreacted ethene gas and ethane diluent. This mixture is cooled and fed to a liquid-gas separator. A portion of the overhead from this separator is purged to maintain the ethane concentration at a desirable level and the remainder is recycled and injected at various points in the reactor. The recycle gas controls the temperature by absorbing the heat evolved during the growth reaction. Cold liquid product might also be used. The liquid from the liquid-gas separator is then fractionated to remove substantially all of the olefins overhead and the higher molecular weight aluminum trialkyls as a bottom product. The olefins thus recovered may be further fractionated or distilled to various olefin cuts. The higher molecular weight aluminum trialkyl is then reacted with additional purified ethene in a second zone under elevated temperatures and pressures and in the presence of a displacement catalyst to generate olefins whose carbon chain lengths correspond to the alkyl radicals in the higher molecular weight aluminum trialkyls as a bottoms product. ethyl is also formed by this displacement reaction. The product mixture from this displacement reaction will then comprise olefins, aluminum triethyl, ethene and a small amount of ethane. This mixture is then recycled to the first or growth zone wherein the aluminum alkyl and ethene act as primary reactants and the olefins serve as the diluent.

As the growth reagent, various low molecular weight alkenes, such as ethene, propene, butene, etc., may be employed. However, ethene is particularly preferred because it reacts readily and will form straight chain alkyl radicals whereas propene and higher molecular weight alkenes have a tendency to form branched chain alkyl radicals. In the displacement reaction, any alkene will generally displace an alkyl radical of the aluminum trialkyl which has more carbon atoms than said alkene. However, under the proper conditions, this reaction can be reversed as shown by the following equation:

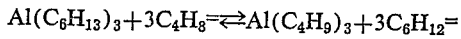

Ethene is particularly preferred as a displacement reactant since it permits the rapid generation of $C_{4+}$ olefins. However, propene, butene and other alpha olefins may also be used. In any case, it is desirable but not absolutely necessary in the displacement reaction to use a straight chain alkene in order to form as one of the components of the product mixture an aluminum straight chain trialkyl suitable for reuse in the growth reactor for the preparation of straight chain olefins.

This invention will now be described in greater detail with reference to the flow sheet drawing which illustrates an embodiment of this process.

Aluminum triethyl, ethene and ethane, together with an inert diluent, such as olefins of the type being generated in the displacement reactor 18, are passed to the growth reactor 1. In the place of aluminum triethyl, other aluminum alkyls such as aluminum tripropyl and aluminum tributyl may be used depending on the type of olefin used for alkyl displacement. For example, if n-butene-1 were used for displacement, the feed to growth would consist of straight chain olefins and aluminum tri-n-butyl. In this case, ethene would be introduced directly into the growth reactor rather than into the displacement stage. The growth reactor 1 may be a pressure unit similar to those employed in the well-known oxo or carbonylation process. Reactor 1 preferably contains several sections packed with Raschig rings or any other suitable material for obtaining good liquid-gas contact. Due to the high heat of reaction, it is necessary to control the temperature within the reactor. One method contemplated is by interstage cooling with recycle ethene-ethane gas as shown by lines 26, 27 and 28. Cold liquid product may be used as a coolant if desired. In order to effect a buildup or growth of ethene onto the aluminum trialkyl, certain temperature and pressure conditions must be maintained. Generally, temperatures between 185° F. and 260° F., and ethene partial pressures between 300 p.s.i.g. and 3000 p.s.i.g. may be employed. However, preferred conditions are 210° F. to 230° F. and 1200 p.s.i.g. to 3000 p.s.i.g. ethene partial pressure. In any case, temperature control is important in the growth stage, since above about 260° F. the displacement reaction begins to be significant and higher molecular weight aluminum alkyls forming within the growth reactor may react with ethene to prematurely form aluminum triethyl and olefin. These olefins as well as the diluent olefins can also react with aluminum alkyls forming higher molecular weight branched olefins. These undesirable side reactants are illustrated below:

(1)     $Al(C_4H_9)_3 + 3C_2H_4 \rightarrow Al(C_2H_5)_3 + 3C_4H_8$ (2)

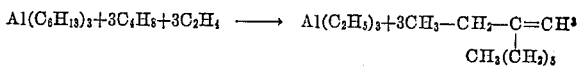

The undesirable formation of branched chain olefins in the growth reactor as typified by Equation 2 may be considerable; however, such side reactions can be suppressed by control of the temperature within the reactor.

It is pointed out that straight chain aluminum trialkyls, such as aluminum triethyl, aluminum tri-n-propyl and aluminum tri-n-butyl, are not necessarily employed as the initial growth reactant even if straight chain olefins are the desired product. If, for example, aluminum trialkyl such as aluminum triisobutyl is employed as the initial growth reactant, a displacement of the isobutyl radical will generally occur before growth begins so that the resultant product mixture from aluminum triisobutyl and ethene will probably contain $Al(R)_3$ where R is a straight chain alkyl and isobutene.

Ethene pressure within reactor 1 in part will determine the extent of growth that occurs and, accordingly, the amount of reactants employed may be adjusted to produce the desired olefins. For example, to obtain a $C_4$–$C_{16+}$ olefin product 3 to 27 moles of ethene per mole of aluminum triethyl should be employed. Residence times are generally in the range of 1 to 9 hours.

The thus produced higher molecular weight aluminum alkyls together with unreacted olefin and unreacted ethene and ethane diluent are passed through cooler 2 via line 3 to high pressure liquid gas separator 4, where ethene and ethane are purged to keep the ethane concentration within a reasonable limit, for example 50%. The cold ethene-ethane mixture recovered from the liquid gas separator 4 may be recycled via line 5 to various points of the growth reactor 1. Higher molecular weight aluminum alkyls and olefins are passed via line 6 to the first fractionating tower 7 wherein substantially all of the olefins are fractionated or distilled overhead through line 8 to additional fractionating towers 9 and 10. Tower 9 may reject overhead, via line 11, a $C_4$–$C_8$ olefin cut and as a bottoms cut $C_{10}$–$C_{16+}$ olefin, which is passed via line 12 to the final distillation or fractionating unit 10. Higher ($C_{16+}$) olefins are recovered as a bottoms stream from tower 10 via line 13, whereas the $C_{10}$–$C_{14}$ olefin product, which may contain some aluminum trialkyl entrained therein, is taken overhead via line 14, treated with dilute sodium hydroxide, passed to mixer 15 and settler 16. From settler 16 $NaAlO_2$ and alkane formed as a result of reacting aluminum alkyl with sodium hydroxide may be rejected. From the first fractionating tower 7 the high molecular weight aluminum alkyls are passed via line 17 to a displacement reactor 18. Within the displacement reactor 18, under certain reaction conditions and catalysis, ethene, which may be introduced into said tower via line 19, displaces the alkyl radicals of the aluminum trialkyls to generate olefins and aluminum triethyl. This mixture, together with unreacted ethene and small amounts of ethane is passed through cooler 20 via line 21 to the growth reactor 1 as recycle. Temperatures and pressures to be maintained in displacement reactor 18 are 100° F. to 230° F., and 0 p.s.i.g. to 3000 p.s.i.g.

Nickel supported on an inert carrier such as kieselguhr, alumina, silica, etc., has been found to be an especially effective catalyst for the displacement reaction. However, in general, the metals of the first transition series as well as the platinum group metals will catalyze the desired displacement reaction. These catalysts may be supported on the inert carriers mentioned above or used as finely divided suspensions. When used in the finely divided condition, the catalysts are more effective in promoting the displacement reaction than when supported on a carrier. Supported catalysts may be of the well known commercial types containing 5–60% of active material. Preferably from 0.5 to 20 lb. feed/hr./lb. active component is employed.

Since the lower molecular weight aluminum trialkyls are somewhat dangerous to handle, certain safety features are desirably employed. In the growth and displacement reactors 1 and 18, recycle olefin from displacement reactor 18 will serve as the inert diluent to prevent spontaneous combustion. When the system is first started up, any inert diluent such as octane, benzene, etc. will serve the purpose.

Also during the operation, diluent may be added to reactor 1 as a supplement to the olefins if needed. Water cooling should be eliminated in these reactors, since the aluminum trialkyls react explosively with water. Towers 7, 9 and 10 may contain conventional reflux 22 and reboiler 23 apparatus. In a continuous process such as described above, some aluminum will be lost as shown for example at unit 16. Accordingly, aluminum alkyl make-up may be introduced into the system at various points, preferably via line 24 to the displacement reactor. Aluminum tri-n-butyl, aluminum triisobutyl, aluminum triethyl, aluminum dialkyl hydride, aluminum monoalkyl dihydride or aluminum hydride may be employed for this purpose.

Olefins derived from this process are extremely valuable as intermediates for producing straight-chain plasticizer and detergent range alcohols, in addition to straight-chain aldehydes and acids.

It is apparent from the above described process that the need for a second control growth stage is completely eliminated. To further illustrate the present invention, a specific example of operating conditions in a continuous two step aluminum alkyl process for the preparation of olefins is set forth below:

EXAMPLE

*Growth reactor*

| | |
|---|---|
| Temperature, °F | 210 |
| Pressure, p.s.i.g | 3000 |
| Ethene partial pressure, p.s.i.g | 2000 |
| Residence time, hrs | 2 |

*Composition of product from growth*

| | Mole percent |
|---|---|
| $Al(C_4H_9)_3$ | 8.0 |
| $Al(C_6H_{13})_3$ | 7.4 |
| $Al(C_8H_{17})_3$ | 5.3 |
| $Al(C_{10}H_{21})_3$ | 2.4 |
| $Al(C_{12}H_{25})_3$ | 0.9 |
| $Al(C_{14}H_{29})_3$ | 0.6 |
| Al(higher alkyls)$_3$ | 0.3 |

*Displacement reactor*

| | |
|---|---|
| Temperature, °F | 160 |
| Pressure, p.s.i.g | 1200 |
| Residence time, hrs | 1.5 |
| Catalyst | 15% Ni on kieselguhr. |
| Lbs.feed/hr./lb.Ni | 6 |

*Composition of alkyl stream to displacement*

| | Mole percent |
|---|---|
| $Al(C_4H_9)_3$ | 32.0 |
| $Al(C_6H_{13})_3$ | 29.8 |
| $Al(C_8H_{17})_3$ | 21.2 |
| $Al(C_{10}H_{21})_3$ | 9.7 |
| $Al(C_{12}H_{25})_3$ | 3.6 |
| $Al(C_{14}H_{29})_3$ | 2.4 |
| Al(higher alkyls)$_3$ | 1.3 |

*Composition of growth feed (ex. ethene, ethane)*

| | Mole percent |
|---|---|
| $C_4$ Olefin | 24.0 |
| $C_6$ Olefin | 22.2 |
| $C_8$ Olefin | 15.9 |
| $C_{10}$ Olefin | 7.3 |
| $C_{12}$ Olefin | 2.8 |
| $C_{14}$ Olefin | 1.9 |
| $C_{16+}$ Olefin | 1.0 |
| $Al(C_2H_5)_3$ | 24.9 |

*Olefin production*

| | Parts by weight |
|---|---|
| $C_4$ | 7.5 |
| $C_6$ | 10.5 |
| $C_8$ | 10.0 |
| $C_{10}$ | 5.7 |
| $C_{12}$ | 2.6 |
| $C_{14}$ | 2.1 |
| $C_{16+}$ | 1.2 |

What is claimed is:

1. A continuous process for producing straight chain olefins which comprises reacting in a first zone, ethene with a low molecular weight aluminum trialkyl under elevated temperatures and pressures in the presence of an inert diluent to form a higher molecular weight aluminum trialkyl, separating the higher molecular weight aluminum trialkyl from said inert diluent, reacting in a second zone said higher molecular weight aluminum trialkyl with ethene under elevated temperatures in the presence of a displacement catalyst to generate olefins corresponding to the alkyl radicals of the higher molecular weight aluminum trialkyl and aluminum triethyl, passing product obtained from said second zone to said first zone, employing said generated olefins of said product as diluent in said first zone, and reacting aluminum triethyl from said second zone with ethene in said first zone in the presence of said generated olefins to form higher molecular weight aluminum trialkyl, and separating the generated olefins as product.

2. A continuous process for producing straight chain olefins having from 4 to 16 carbon atoms in the molecule which comprises passing into a growth zone an inert diluent comprising olefin, aluminum triethyl and ethene gas, maintaining elevated temperatures and pressures in said growth zone, thereby producing a mixture of higher molecular weight aluminum trialkyls, wherein said alkyl radicals each contain from 4 to 16 carbon atoms, passing the resulting mixture from said first zone to a separation zone and separating the olefin diluent from said higher molecular weight aluminum trialkyls, passing said aluminum trialkyls into a displacement zone, reacting said higher molecular weight aluminum trialkyls with ethene under elevated temperatures in the presence of a displacement catalyst to generate olefins corresponding to the alkyl radicals of the higher molecular weight aluminum trialkyls and aluminum triethyl, and recycling product from said displacement zone containing aluminum triethyl and generated olefins to said growth zone.

3. In a continuous process for producing straight chain olefins which comprises reacting in a first zone, ethene with a low molecular weight aluminum trialkyl under elevated temperatures and pressures in the presence of an inert diluent to form a higher molecular weight aluminum trialkyl, separating the higher molecular weight aluminum trialkyl from said inert diluent, reacting in a second zone said higher molecular weight aluminum trialkyl with a lower alkene under elevated temperatures in the presence of a displacement catalyst to generate olefins corresponding to the alkyl radicals of the higher molecular weight aluminum trialkyl and low molecular weight aluminum trialkyl, the improvement which comprises passing product obtained from said second zone containing said low molecular weight aluminum trialkyl and generated olefins to said first zone, employing said generated olefins as diluent in said first zone, reacting low molecular weight aluminum trialkyl from said second zone with ethene in said first zone in the presence of said generated olefins to form higher molecular weight aluminum trialkyl, and separating said generated olefins as product.

4. A process in accordance with claim 3 wherein the conditions maintained in said first zone are between 185° F. and 260° F. and 300 to 3000 p.s.i.g., and in said second zone between 100° F. and 230° F. and 0 to 3000 p.s.i.g.

5. A process in accordance with claim 3 wherein said low molecular weight aluminum trialkyl is aluminum triethyl.

6. In a continuous process for producing straight chain olefins which comprises reacting in a first zone ethene with a low molecular weight aluminum trialkyl under elevated temperatures and pressures in the presence of an inert diluent comprising olefin for a time sufficient to grow said ethene on to said low molecular weight aluminum trialkyl to form a higher molecular weight aluminum trialkyl containing from 4 to 16 carbon atoms in each of said alkyl groups, fractionating the resultant mixture to separate the higher molecular weight aluminum trialkyl from said olefin diluent, reacting in a second zone said higher molecular weight aluminum trialkyl with ethene under elevated temperatures and pressures in the presence of a displacement catalyst to generate olefins corresponding to the alkyl radicals of the higher molecular weight aluminum trialkyl and aluminum triethyl, the improvement which comprises passing product obtained from said second zone containing aluminum triethyl and generated olefins to said first zone, employing the said generated olefins as diluent in said first zone, reacting said aluminum triethyl with ethene in said first zone in the presence of said generated olefins to form higher molecular weight aluminum trialkyl, and separating said generated olefins as product.

7. A process in accordance with claim 6 wherein the conditions maintained in said first zone are between 185° F. and 260° F. and 300 to 3000 p.s.i.g., and in said second zone between 100° F. and 230° F. and 0 to 3000 p.s.i.g.

References Cited in the file of this patent
UNITED STATES PATENTS

| 2,554,275 | Smith | May 22, 1951 |
| 2,695,327 | Ziegler et al. | Nov. 23, 1954 |
| 2,699,457 | Ziegler et al. | Jan. 11, 1955 |

OTHER REFERENCES

"Catalysis," Berkman et al., published by Reinhold Publishing Corp., New York (1940), pages 721–722.